United States Patent
Thomas et al.

(10) Patent No.: US 9,667,046 B2
(45) Date of Patent: May 30, 2017

(54) WEATHERPROOF BOX WITH CLAMPING HUB

(71) Applicant: HUBBELL INCORPORATED, Shelton, CT (US)

(72) Inventors: Jason Thomas, Mesa, AZ (US); Richard J. Wagner, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/079,420

(22) Filed: Mar. 24, 2016

(65) Prior Publication Data

US 2016/0294170 A1 Oct. 6, 2016

Related U.S. Application Data

(60) Provisional application No. 62/140,918, filed on Mar. 31, 2015.

(51) Int. Cl.
| | |
|---|---|
| *H02G 3/08* | (2006.01) |
| *H02G 13/00* | (2006.01) |
| *H02G 3/14* | (2006.01) |
| *H05K 7/14* | (2006.01) |
| *H02G 3/06* | (2006.01) |

(52) U.S. Cl.
CPC ............. *H02G 3/08* (2013.01); *H02G 3/0675* (2013.01); *H02G 3/088* (2013.01)

(58) Field of Classification Search
CPC H02G 3/08; H02G 3/088; H02G 3/22; H02G 3/0675

USPC ................. 174/50, 64, 66, 67, 535
See application file for complete search history.

(56) References Cited

U.S. PATENT DOCUMENTS

| | | | | |
|---|---|---|---|---|
| 3,927,249 A | * | 12/1975 | Pearse | H02B 1/28 174/51 |
| 4,536,613 A | * | 8/1985 | Gallas | H02G 3/0683 174/660 |
| 5,012,043 A | * | 4/1991 | Seymour | H02G 3/18 174/57 |
| 5,013,872 A | * | 5/1991 | Lockwood | H01R 4/64 174/663 |
| 5,132,493 A | * | 7/1992 | Sheehan | H02G 3/0675 174/655 |
| 5,659,151 A | * | 8/1997 | Dale | H02G 3/121 174/53 |
| 2011/0290625 A1 | * | 12/2011 | Castaldo | H02G 3/081 200/297 |
| 2015/0357806 A1 | * | 12/2015 | Korcz | H02G 3/083 174/541 |

* cited by examiner

*Primary Examiner* — Sherman Ng
(74) *Attorney, Agent, or Firm* — Dickinson Wright PLLC (57) ABSTRACT

An electrical box assembly includes an electrical box having a side wall and an open top end and a conduit access port opening extending through the side wall and having a dimension to receive a conduit. A seal is received in the opening for surrounding the conduit. A clamp is positioned in the opening in the side wall and is positioned between the side wall and the seal for contacting an outer surface of the seal. An actuator is coupled to the electrical box and extends through the side wall into the opening in the side wall to contact the conduit clamp to constrict said conduit clamp and seal into clamping engagement with the conduit.

18 Claims, 7 Drawing Sheets

WEATHERPROOF BOX WITH CLAMPING HUB

This application claims the benefit under 35 U.S.C. §119 (e) of U.S. Provisional Patent Application Ser. No. 62/140, 918 filed Mar. 31, 2015, which is hereby incorporated by reference in its entirety.

FIELD OF THE INVENTION

The present invention is directed to an electrical box having a clamping assembly for coupling a conduit to the electrical box. The invention is particularly directed to an electrical box having a clamp assembly with a clamping ring coupled to the box for clamping around the conduit to clamp and fix the conduit to the box. The clamping assembly can form a weatherproof seal between the conduit and the electrical box.

BACKGROUND OF THE INVENTION

Electrical boxes are constructed for enclosing wiring and supporting electrical wiring devices in various locations and environments. Metallic and non-metallic electrical boxes are constructed with an access opening to receive wiring and coupling members. The coupling members can be constructed to be able to attach to the opening in the electrical box and for receiving a conduit. Suitable fasteners are generally provided to secure the conduit to the coupling members.

Electrical boxes are also constructed with a conduit port for receiving the end of a conduit and coupling the conduit to the port. A suitable sealant can be provided to form a weatherproof seal between the conduit and the electrical box. The port can have internal threads for receiving the end of a threaded conduit. Other electrical boxes have a clamping a mechanism, such as a screw, in the port for contacting the outer surface of the conduit.

Conduit connectors can also have a friction or interference fit to secure the conduit in the connector. These devices generally include a tab or prong that allows the conduit to slide into the connector while resisting removal of the conduit.

While the prior electrical boxes and clamping mechanisms have been suitable for their intended purpose, there is a continuing need in the industry for improved conduit clamping assemblies.

SUMMARY OF THE INVENTION

The present invention is directed to an electrical box having a coupling mechanism for attaching a conduit to the electrical box. In particular, the invention is directed to a weatherproof electrical box having a clamping hub assembly to clamp the outer surface of the conduit and attach the conduit to the access port or opening of the electrical box.

The weatherproof electrical box of the invention can be made of metal or plastic materials depending on the intended use. In one embodiment, the electrical box has a substantially rectangular shape with a bottom wall, opposing side walls, opposing end walls, and an open top end. The top end includes mounting tabs, bosses, posts or other support structure for supporting an electrical wiring device or a cover.

The walls of the electrical box include at least one access port or opening for electrical wiring and a conduit. The access port has a dimension to receive the conduit and to secure the conduit in the access port and provide a weather proof seal between the conduit and the electrical box.

The electrical box includes a clamp assembly for coupling with a conduit and providing a weatherproof seal between the access port in the electrical box and the conduit. The clamp assembly provides a quick connection of the conduit to the electrical box. The clamp assembly can include coupling components positioned in the access port.

The features of the invention are provided by the clamping assembly having a coupling ring and an elastic or flexible seal member that are positioned in the access port. The seal has a substantially annular shape and is received in the access port to be positioned between the conduit and the inner surface of the access port. The coupling ring has an annular shape and fits around the seal. A clamping or actuator member in the electrical box compresses the coupling ring to reduce the inner diameter of the ring to apply an inwardly directed radial force to compress the seal against the surface of the conduit and form a weatherproof seal between the conduit and the electrical box.

The objects of the invention are further attained by providing an electrical box with recess formed on an outer face of at least one end wall that has an access port. The recess surrounds the access port and has a dimension to receive a seal and a coupling ring. An outer cover plate is attached to the outer face of the wall of the electrical box to close the recess and retain the seal and the coupling ring within the recess. The cover plate includes an access opening with a dimension for receiving the conduit. The recess is defined by a housing having a side and top wall extending inwardly from the inner face of the wall of the electrical box. The access opening extends through the inner face of the housing to communicate with the conduit. The top wall has a threaded hole receiving an actuator screw that is aligned with the coupling ring for contacting the ring and compressing against the seal to form a weatherproof seal between the outer surface of the conduit and the electrical box.

These and other advantages are basically attained by providing an electrical box assembly including an electrical box having a side wall with an access opening with a dimension to receive a conduit. The conduit coupling, such as the conduit coupling ring, is positioned in the opening in the electrical box for clamping and sealing the conduit. An actuator is positioned within the electrical box for engaging the conduit coupling for compressing the conduit coupling into clamping engagement with the conduit.

The objects and advantages of the invention are further attained by providing an electrical box assembly including an electrical box having a side wall, an open top end and an access port opening extending through the side wall and having a dimension for receiving a conduit. A cylindrical seal is positioned in the opening in the side wall. A conduit coupling is received in the opening in the side wall and positioned between the side wall and the seal. An actuator coupled to the electrical box is accessible through the open top end of the electrical box. The actuator extends through the said side wall into contact with the conduit coupling to constrict the conduit coupling and the seal into clamping engagement with the conduit.

The features of the invention are also attained by providing an electrical box assembly including an electrical box having a side wall and an open top end, and a conduit access opening extending through the side wall where the opening has a dimension to receive a conduit. A conduit clamping ring is positioned in the opening in the side wall. The clamping ring has a first free end and a second free end overlapping the first free end. The clamping ring has a central opening with a dimension for receiving the conduit. An actuator is coupled to the electrical box and is accessible through the open top end of the electrical box. The actuator extends through the side wall into the access opening. The actuator is movable to engage an outer surface of the clamping ring and reduce an inner diameter of the clamping ring to engage an outer surface of the conduit.

These and other objects and advantages of the invention will become apparent from the annexed drawings and the following detailed description of the invention which show various embodiments of the invention.

BRIEF DESCRIPTION OF THE DRAWINGS

The following is a brief description of the drawings in which.

DETAILED DESCRIPTION OF THE INVENTION

The present invention is directed to an electrical box having a coupling assembly for coupling a conduit to an access port provided in at least one side wall of an electrical box. The invention is particularly directed to an electrical box having a seal and clamping ring provided with the electrical box an assembly to form a weatherproof seal between the conduit and the electrical box.

Referring to the drawings, the electrical box assembly 10 includes an electrical box 12 and a clamping assembly 14. The electrical box 12 of the invention includes a bottom wall 16, a plurality of side walls 18 and an open top end 20. In the embodiment shown, the electrical box 12 has a substantially rectangular shape with opposing side walls and opposite end walls defining the open top end 20. In the embodiment shown, the electrical box 12 is a non-metallic box made from a suitable plastic material. The electrical box 12 is typically made as a one-piece integrally formed unit. In other embodiments, the electrical box can be a multi-gang box for supporting a plurality of electrical devices.

Figure 1:
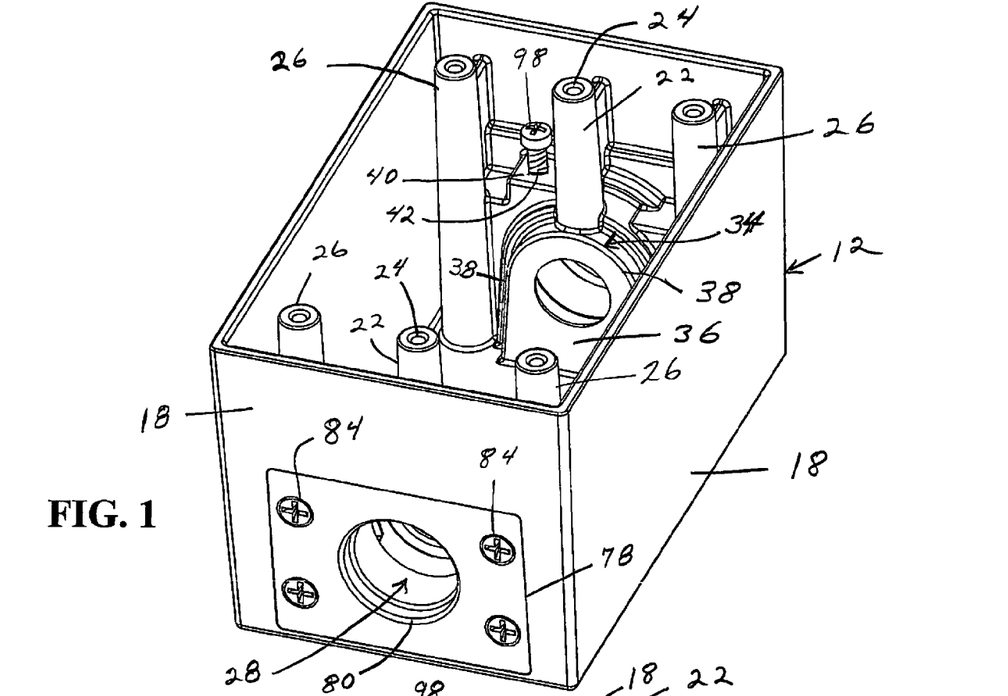
FIG. 1 is a front perspective view of the electrical box in one embodiment of the invention.
Figure 2:
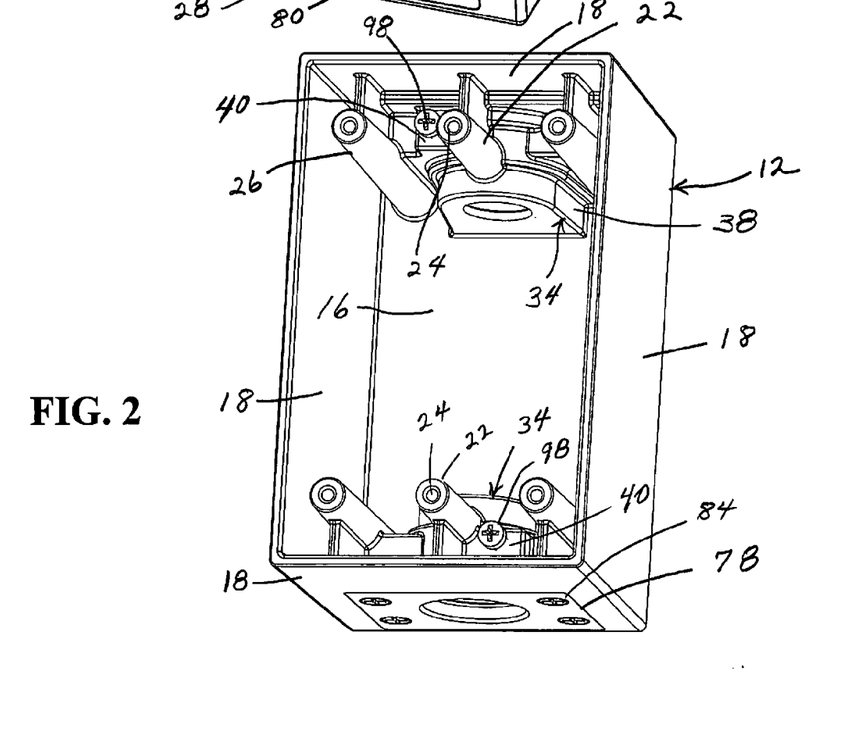
FIG. 2 is a top perspective view of the electrical box of FIG. 1.
Figure 3:
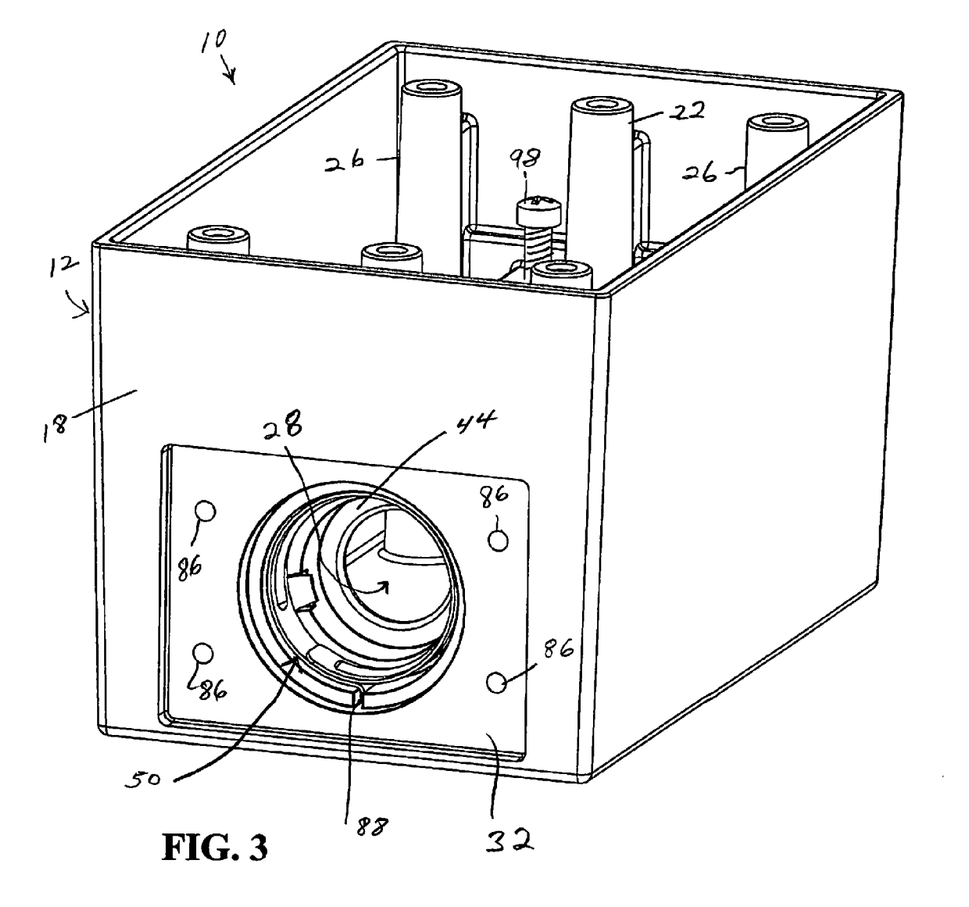
FIG. 3 an enlarged front perspective view of the electrical box of FIG. 1 showing the access port with the cover removed.

As shown in FIGS. 1 and 2, the electrical box 12 has a plurality of centrally located bosses 22 extending upwardly from the bottom wall 16 spaced along the end of the side walls 18. Each boss 22 has a generally cylindrical shape with a screw hole 24 extending axially through the boss 22 from the top end 20 for receiving a mounting screw. The centrally located bosses 22 are aligned for mounting an electrical wiring device in the open top end in a standard manner. The electrical wiring device can be, for example, an electrical switch or receptacle. In the embodiment shown, the centrally located bosses 22 are positioned for mounting the electrical wiring device in the center of the electrical box 12. In other embodiments, a plurality of bosses 22 can be provided for mounting a plurality of electrical wiring devices in the box in a ganged relationship.

The electrical box 12 also includes bosses 26 positioned in the corners of the electrical box and having a screw hole extending axially through the bosses 26. In the embodiment shown, the bosses 26 are oriented for receiving an attachment screw for attaching a cover plate or face plate to the electrical box. Alternatively, the bosses 26 can be positioned for receiving an electrical wiring device.

Figure 4:
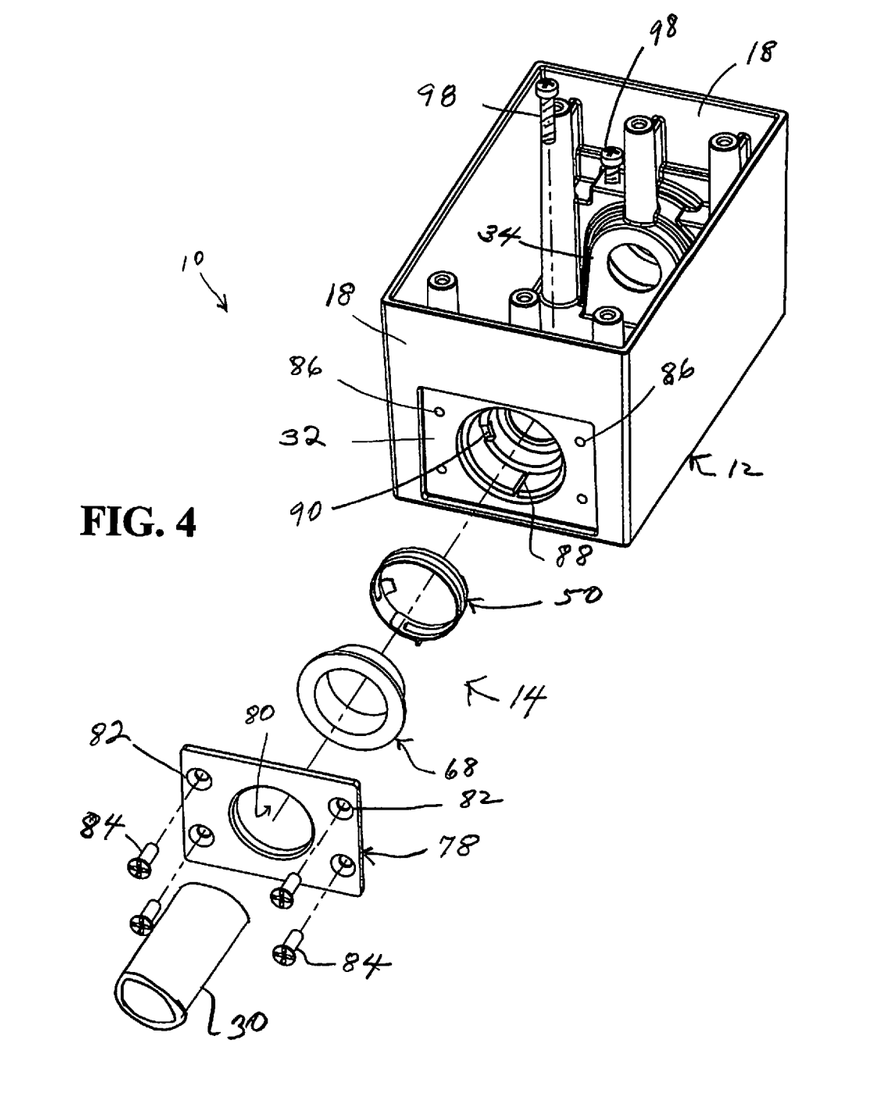
FIG. 4 is an exploded front perspective view of the electrical box of FIG. 1.
Figure 8:
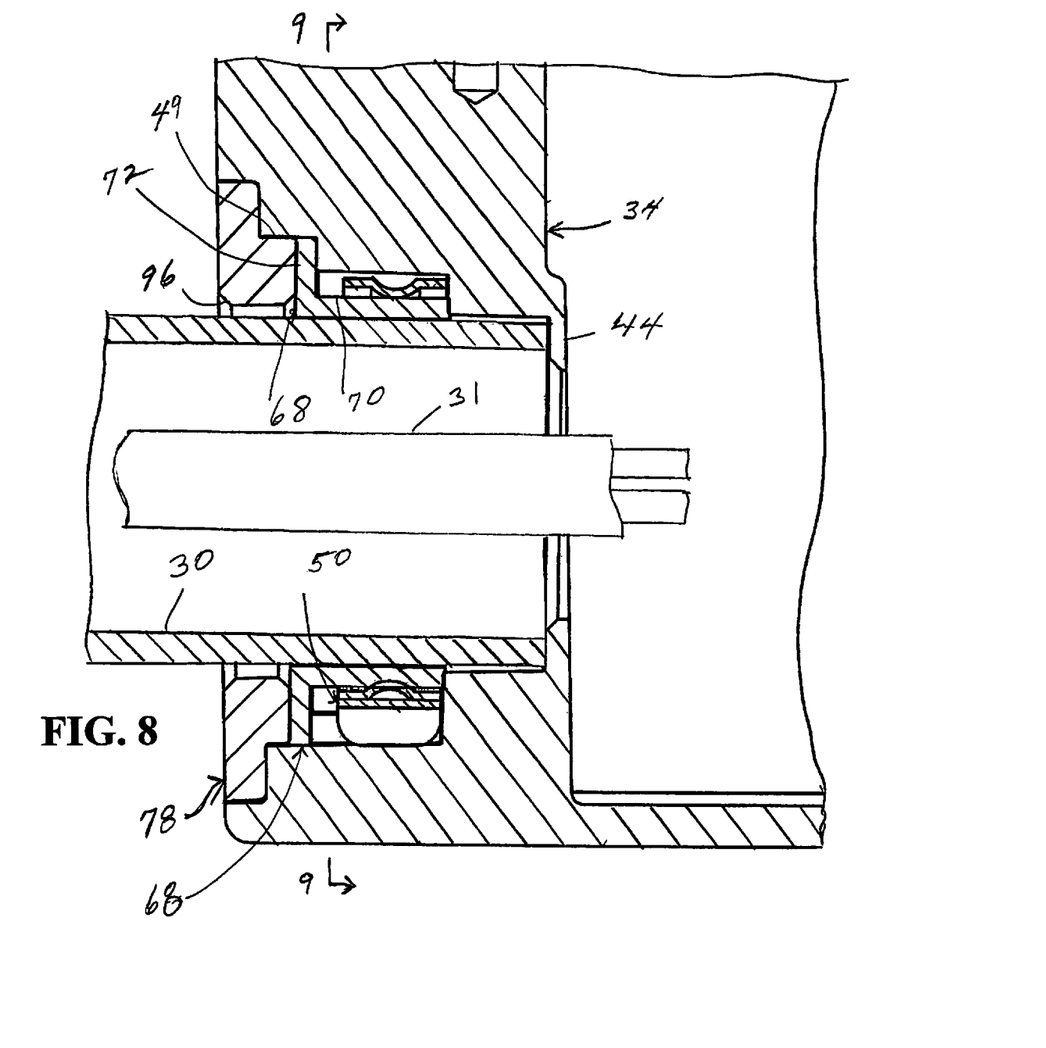
FIG. 8 is an enlarged cross-sectional view of the electrical box showing the conduit positioned in the access port.

The electrical box 12 has at least one conduit access port 28 defining a conduit opening with a dimension for receiving a conduit 30 and electrical wiring 31 passing through the conduit as shown in FIG. 4 and FIG. 8. As shown in the drawings, the side wall 18 includes a recess 32 formed on the outer face of the side wall surrounding the access port 20.

A housing 34 is formed on the inner surface each of the side walls 18 defining the access port 28 and conduit opening. In one embodiment, the housing 34 is formed as an integral part of the side wall. In the embodiment shown, the opposite side walls 18 include an access port 28 and a housing 34 formed at each opposite side wall accommodating the respective access port. As shown in the drawings, each housing 34 is formed integrally with the bottom wall 16 and the opposite side walls 18. The housing 34 has an inner face 36, side faces 38 and a top face 40. In the embodiment shown, the bosses 22 are integrally formed with the housing 34 and extend upwardly from the top face 40. The access port 28 extends through the side wall and the housing 34 between the inner face 36 of the housing 34 and the outer face of the side wall 18. A screw hole 42 extends from the top face 40 of the housing 34 to the access port 28. In the embodiment shown, the screw hole 42 is oriented off center from the center axis of the access port to extend in a substantially tangential relationship to the outer surface of the access port 28.

Figure 5:
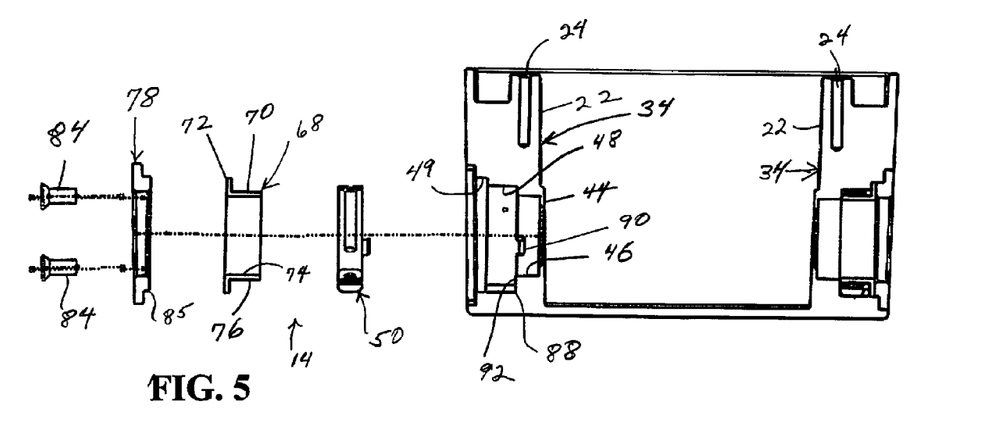
FIG. 5 is an exploded view of the electrical box in cross-section.
Figure 7:
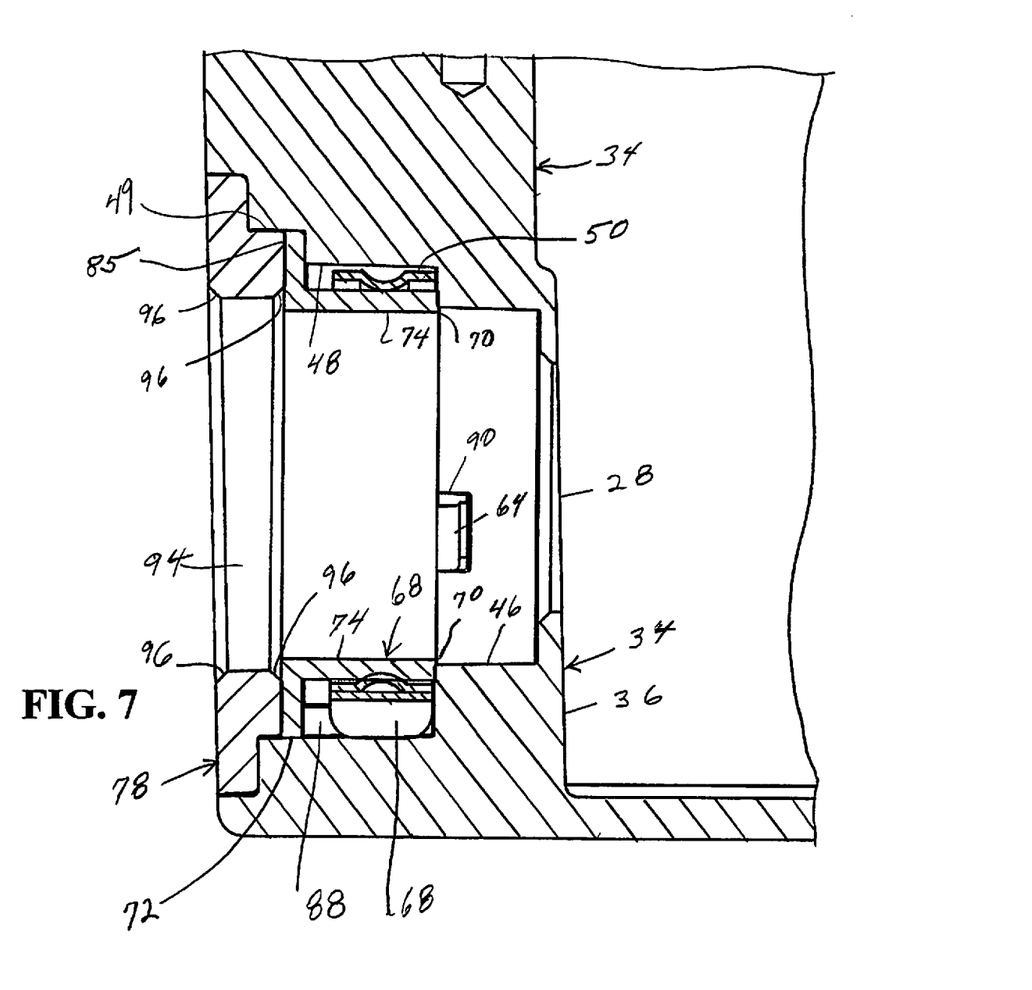
FIG. 7 is an enlarged cross-sectional view of the electrical box of FIG. 1.

The access port 28 has a circular configuration for receiving the conduit 30. The interior cavity of the access port has a dimension for receiving the conduit 30 and to allow electrical wiring to pass through the side wall 18 into the cavity of the electrical box 12. Referring to FIGS. 5 and 7, the access port 28 has a dimension to receive the conduit 30 and the clamping assembly 14. The access port 28 is defined by an inner wall 44 formed with the inner face 36 of the housing 34. Inner wall 44 has an opening with a dimension to receive the electrical wiring to allow the electrical wiring 31 to pass into the electrical box and has an inner diameter less than the outer diameter of the conduit 32 prevent the conduit from passing into the cavity of the electrical box 12. In this manner, the inner wall 44 serves as a stop member for the conduit 30. As shown in FIG. 5, the access port has a first portion 46 adjacent the inner wall 44 that has a cylindrical configuration with an inner diameter corresponding substantially to the outer diameter of the conduit 30 to receive the conduit. The first portion 46 has a dimension to allow the conduit 30 to slide through the access port into contact with the inner wall 44.

The access port 28 has a second portion 48 adjacent the first portion 46 and spaced outwardly from the first portion 46 and the inner wall 44. The second portion 48 has a substantially cylindrical configuration with an inner diameter greater than the inner diameter of the first portion 46. The second portion 48 extends between the recess 32 and the first portion 46.

Figure 6:
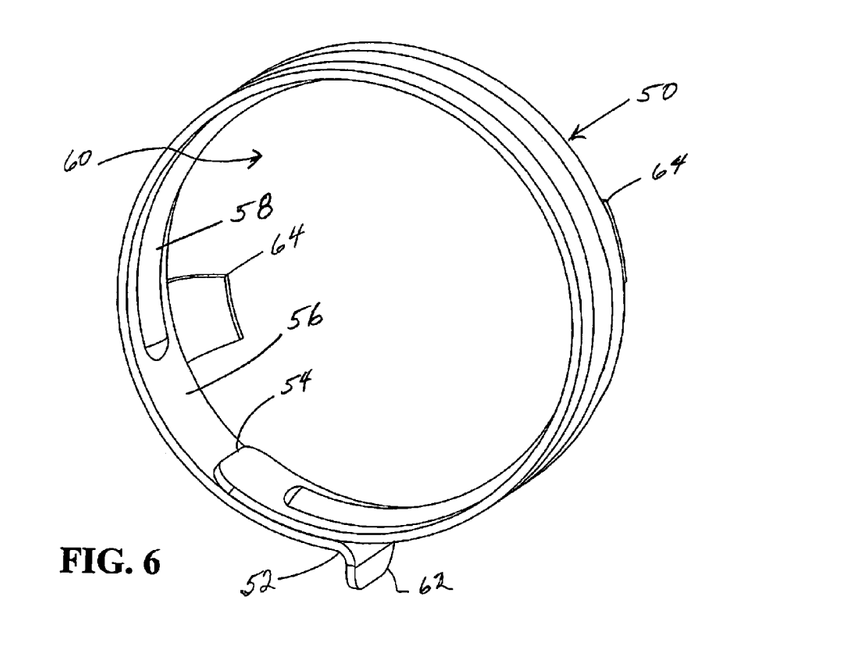
FIG. 6 is a perspective view of the clamping spring.

The clamping assembly in the embodiment shown includes an actuator for applying a clamping force to the first conduit. The actuator in one embodiment of the invention is a clamping ring 50 having a substantially circular configuration. The clamping ring 50 has a first free end 52 and a second free end 54. The second free end 54 overlaps the first free end 52 as shown in FIG. 6 to allow the inner diameter of the clamping ring to expand and contract when the clamping force is applied to the outer surface of the clamping ring 50. The inner surface 56 of the clamping ring 50 includes a longitudinally extending rib 58 that encircles a substantial portion of the axial passage 60 of the clamping ring 50. In the embodiment shown, the first free end 52 includes a tab 62 that extends radially outward from the free end 52. Inwardly extending tabs 64 project from opposite sides of the clamping ring 50 into the axial passage 60 as shown in FIG. 6.

A seal member 68 is provided for forming a gasket and a weatherproof seal between the conduit 30 and the electrical box 12. In the embodiment shown, the seal 68 has a substantially cylindrical body 70 and a flange 72 extending radially outward from an axial end of the cylindrical body 70. The cylindrical body 70 has an inner surface 74 with an inner dimension corresponding substantially to the outer dimension of the conduit 30. In the embodiment shown, the seal 68 is made of a rubber or elastic material that is sufficiently flexible and resilient to be compressed against the outer surface of the conduit 30 and form a weatherproof seal. The cylindrical body 70 has an outer surface 76 with an outer dimension complementing the inner dimension of the clamping ring 50. The outwardly extending radial flange 72 has an outer dimension complementing an annular recess 49 provided at the end of the second portion 48 of the access port 28. The cylindrical body 70 fits within the second portion 48 of the access port with the radial flange 72 received in the annular recess 49.

A cover plate 78 as shown in FIG. 1 and FIG. 5 is attached to the outer surface of the side wall 18 of the electrical box and is received within the recess 32. In the embodiment shown, the cover plate 78 has a substantially rectangular configuration corresponding to the rectangular configuration of the recess 32. The cover plate 78 includes a central opening 80 aligned with the access port 28 of the electrical box 12. The screw holes 82 are provided in the cover plate 78 for receiving screws 84 to pass through the cover plate and thread into screw holes 86 within the recess 32 for attaching the cover plate 78 to the side wall 18. The cover plate 78 includes an annular collar 85 around the central opening 80 and extends outwardly from a rear side of the cover plate. The annular collar 85 has a dimension to fit in the recess 49 as shown in FIGS. 7 and 8 to capture the radial flange 72 of the seal 68 within the access port. The annular collar 85 clamps the radial flange 72 to form a weatherproof seal between the access port in the electrical box and the seal 68.

Referring to FIGS. 7 and 8, the clamping ring 50 is positioned around the cylindrical body 70 of the seal 68. The seal 68 and the clamping ring 50 are positioned in the access port 28 in the side wall of the electrical box. In the embodiment shown, the second portion 48 of the access port 28 includes a longitudinally extending slot 88 for receiving the tab 68 of the clamping ring 50 for positioning the clamping ring within the access port and preventing rotation of the second end 52 of the clamping ring 50 within the access port. The first portion 46 of the access port 20 includes notches 90 for receiving the inwardly extending tabs 64 of the clamping ring 50. The seal 68 is positioned within the axial passage of the clamping ring as shown with the axial end contacting the end wall 92 between the first portion 46 and second portion 48 of the axial passage. The radial flange 72 has an outer diameter corresponding to the inner diameter of the recess 49.

The cover plate 78 is attached to the side wall 18 to retain the clamping ring 50 and the seal 68 within access port. The annular collar 85 is compressed against the radial flange 72 of the seal 68 to form a weatherproof seal between the cover 78 and the electrical box 12. As shown in FIG. 7, the central opening 18 of the cover plate 68 has a cylindrical inner surface 84 with beveled edges 96 to assist in directing the conduit 30 through the central opening 18 through the axial passage of the seal 68.

Figure 9:
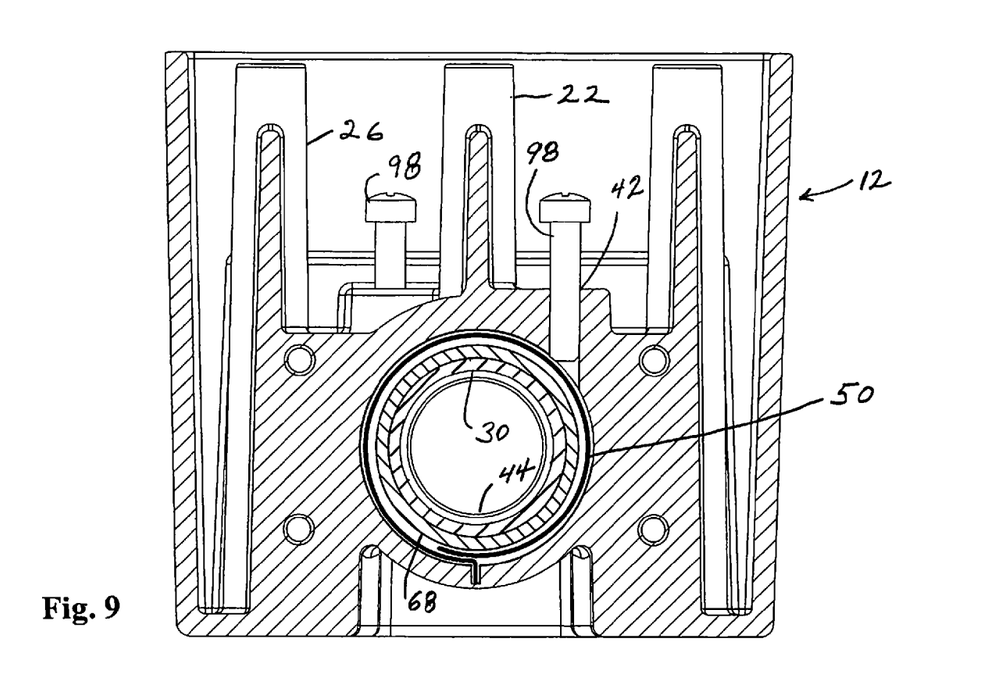
FIG. 9 is a cross-sectional view of the clamping ring assembly in partial cross-section taken along line 9-9 of FIG. 8 showing the actuator screw in the initial position.

An actuator is provided for engaging the clamping ring 50 and forcing the clamping ring 50 into engagement with the seal 68 for clamping the conduit 30 to the electrical box. The actuator in one embodiment of the invention is a threaded actuator screw 98 that extends through the threaded screw hole 42. As shown in FIG. 9, the screw hole 42 is oriented so that the actuator screw 98 contacts the outer surface of the clamping ring 50 at an inclined angle relative to the outer surface of clamping ring 50. In the embodiment shown, the screw 98 is substantially tangential to the outer surface of the clamping ring 50.

Figure 10:
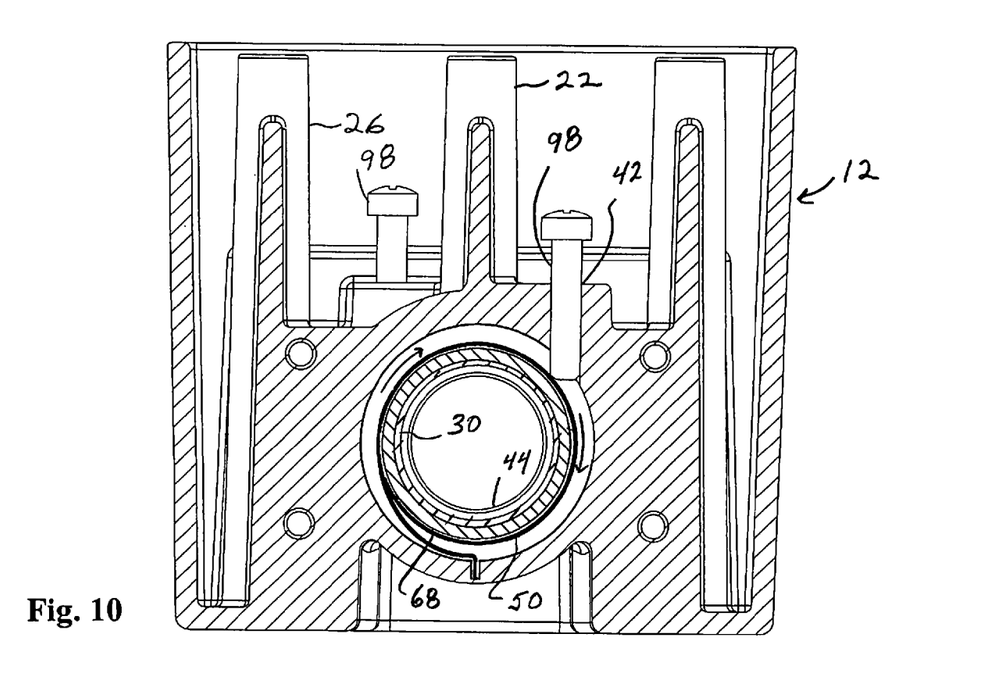
FIG. 10 is a cross-sectional end view showing the actuator screw and clamping ring in the clamping position.

In use, the clamping ring and a seal are positioned in the access port as shown in FIG. 7 and FIG. 8. The conduit 30 is inserted through the central opening of the cover plate 78 and through the axial passage of the seal 68 into contact with the inner wall 44. The actuator screw 98 is tightened into engagement with the outer surface of clamping ring 50. The actuator screw 98 contacts the outer surface of the clamping ring at an angle whereby the free ends of the clamping ring slide with respect to each other to reduce the inner diameter of the clamping ring. By tightening the actuator screw 98, the clamping ring 50 tightens around the seal 68 to compress the seal 68 against the outer surface of the conduit 30 to form a weatherproof seal and to couple conduit 30 to the side wall of the electrical box as shown in FIG. 10. The actuator screw 98 engages the outer surface of the clamping ring 50 to slide the second free end 54 in the direction of the arrow 100 to reduce the inner diameter of the clamping ring 50 to apply an inward radial force against the seal 68.

While various embodiments have been disclosed, it will be understood that various changes and modifications can be made to the invention as defined in independent claims without departing from the spirit and scope of the invention.

What is claimed is:

1. An electrical box assembly comprising:
   an electrical box having a side wall with an opening having a dimension to receive a conduit;
   a conduit clamp positioned in said opening in said electrical box for contacting said conduit, said conduit clamp having a first free end and a second free end overlapping said first free end; and
   an actuator positioned with said electrical box and engaging said conduit clamp for compressing said conduit clamp into clamping engagement with said conduit when said actuator engages said conduit clamp and said second free end to slide over said first free end to reduce an inner diameter of said conduit clamp.

2. The electrical box of claim 1, wherein
   said conduit clamp has a substantially circular shape surrounding said conduit.

3. The electrical box of claim 1, wherein
said first free end of said conduit clamp is coupled to said electrical box to prevent movement of said first free end of said conduit clamp relative to said electrical box.

4. The electrical box assembly of claim 1, further comprising
a seal surrounding said conduit and positioned between said conduit and said conduit clamp.

5. An electrical box assembly comprising:
an electrical box having a side wall and an open top end and a conduit access port extending through said side wall and having a dimension to receive a conduit;
a cylindrical seal in said conduit access port surrounding the conduit;
a clamping ring received in said conduit access port and positioned between an inner surface of said conduit access port and said cylindrical seal for contacting an outer surface of said cylindrical seal, said clamping ring surrounding said seal and having a first free end and a second free end overlapping said first free end; and
an actuator coupled to said electrical box and accessible through said open top end of said electrical box, said actuator extending through said side wall into contact with said conduit clamp to apply a radial inward clamping force against said seal into clamping engagement with said conduit, and where said actuator engages said conduit clamp to slide said second free end over said first free end and reduce an inner diameter of said clamping ring.

6. The electrical box assembly of claim 5, wherein
said clamping ring is substantially circular.

7. The electrical box assembly of claim 5, wherein
said first free end of said clamping ring is coupled to said electrical box to resist movement of said first free end with respect to said electrical box.

8. The electrical box assembly of claim 5, wherein
said cylindrical seal has a cylindrical body for surrounding the conduit and a radial flange forming a seal with the side wall.

9. The electrical box assembly of claim 5, further comprising
a cover plate coupled to said side wall of said electrical box for retaining said clamping ring in said opening in said side wall.

10. The electrical box assembly of claim 5, wherein
said actuator is a screw received in a screw hole in said electrical box and extends into said conduit access port to engage said clamping ring.

11. An electrical box assembly comprising:
an electrical box having a side wall and an open top end and a conduit access port extending through said side wall and having a dimension to receive a conduit;
a conduit clamping ring positioned in said conduit access port opening in said side wall, said clamping ring having a first free end and a second free end overlapping said first free end, said clamping ring having a central opening with a dimension for receiving said conduit; and
an actuator coupled to said electrical box and accessible through said open top end of said electrical box, said actuator extending into said conduit access port in said side wall, said actuator being movable to engage an outer surface of said clamping ring to slide said second free end over said first free end and reduce an inner diameter of said clamping ring to engage an outer surface of said conduit.

12. The electrical box assembly of claim 11, wherein
said clamping ring is substantially circular.

13. The electrical box assembly of claim 11, wherein
said free ends of said clamping ring overlap, whereby a clamping pressure by said actuator reduces an inner diameter of said clamping ring.

14. The electrical box assembly of claim 11, wherein
said free first end of said clamping ring is coupled to said electrical box to resist movement of said first free end with respect to said electrical box.

15. The electrical box assembly of claim 11, further comprising
a seal positioned between said conduit clamping ring and said conduit.

16. The electrical box assembly of claim 15 further comprising
a cover plate coupled to said side wall of said electrical box for retaining said clamping ring and seal in said conduit access port in said side wall.

17. The electrical box assembly of claim 11, wherein
said actuator is a screw received in a screw hole in said electrical box and extends into said conduit access port to engage said conduit clamp.

18. The electrical box assembly of claim 15, wherein
said seal has a cylindrical body for surrounding the conduit and a radial flange forming a seal with the side wall.

* * * * *